(12) United States Patent
Payne et al.

(10) Patent No.: US 10,906,553 B2
(45) Date of Patent: Feb. 2, 2021

(54) SYSTEMS AND METHODS FOR VEHICLE ACCELERATION EVENT PREDICTION INHIBIT

(71) Applicant: Toyota Motor Engineering & Manufacturing North America, Inc., Plano, TX (US)

(72) Inventors: Joshua D. Payne, Ann Arbor, MI (US); Christopher Gauthier, Plano, TX (US)

(73) Assignee: Toyota Motor Engineering & Manufactuiring North America, Inc., Plano, TX (US)

(*) Notice: Subject to any disclaimer, the term of this patent is extended or adjusted under 35 U.S.C. 154(b) by 155 days.

(21) Appl. No.: 16/048,956

(22) Filed: Jul. 30, 2018

(65) Prior Publication Data

US 2020/0031364 A1 Jan. 30, 2020

(51) Int. Cl.
*B60W 50/08* (2020.01)
*B60W 20/15* (2016.01)
*B60W 50/00* (2006.01)
*B60K 6/40* (2007.10)
*B60W 40/09* (2012.01)

(52) U.S. Cl.
CPC ............ *B60W 50/087* (2013.01); *B60K 6/40* (2013.01); *B60W 20/15* (2016.01); *B60W 40/09* (2013.01); *B60W 50/0097* (2013.01); *B60W 2540/106* (2013.01); *B60W 2540/12* (2013.01); *B60W 2540/30* (2013.01); *B60W 2554/00* (2020.02); *B60W 2555/20* (2020.02); *B60Y 2200/92* (2013.01)

(58) Field of Classification Search
CPC ............... B60W 50/087; B60W 20/15; B60W 50/0097; B60W 40/09; B60Y 2200/92
See application file for complete search history.

(56) References Cited

U.S. PATENT DOCUMENTS

| 5,477,825 | A | * | 12/1995 | Hattori | ................. | B60K 31/047 |
| | | | | | | 123/399 |
| 5,532,929 | A | * | 7/1996 | Hattori | ................. | B60K 31/047 |
| | | | | | | 123/361 |
| 9,298,575 | B2 | | 3/2016 | Tamari et al. | | |
| 9,440,654 | B2 | | 9/2016 | Atluri et al. | | |
| 9,909,516 | B2 | | 3/2018 | Dufford | | |
| 10,083,625 | B2 | * | 9/2018 | Knez | ................... | B60W 30/182 |

(Continued)

FOREIGN PATENT DOCUMENTS

KR 20180048120 A 5/2018

*Primary Examiner* — Rami Khatib
(74) *Attorney, Agent, or Firm* — Dinsmore & Shohl LLP (57) ABSTRACT

Methods and systems for inhibiting an acceleration event prediction includes determining a current vehicle operating condition. An acceleration event is predicted based on a plurality of stored predictions that match the current vehicle operating condition. A determination is made whether to inhibit the acceleration event prediction. The acceleration event prediction is permitted to modify an acceleration event powertrain control such that a powertrain control occurs. A driver noncompliance with the acceleration event powertrain control is stored as a machine learning data and the current vehicle operating condition is stored as machine learning data upon the driver noncompliance. The stored machine learning data is used to determine whether to inhibit a future acceleration event prediction.

13 Claims, 4 Drawing Sheets

(56) References Cited

U.S. PATENT DOCUMENTS

| | | | |
|---|---|---|---|
| 2012/0022764 A1* | 1/2012 | Tang | B60W 10/06 |
| | | | 701/102 |
| 2017/0361832 A1* | 12/2017 | Schwartz | B60W 10/10 |
| 2018/0118191 A1 | 5/2018 | Park | |
| 2018/0170356 A1* | 6/2018 | Lee | B60K 6/442 |
| 2018/0259956 A1* | 9/2018 | Kawamoto | B60W 50/082 |
| 2018/0281775 A1* | 10/2018 | Lee | B60W 20/12 |
| 2018/0370523 A1* | 12/2018 | Geller | B60W 10/10 |
| 2019/0023257 A1* | 1/2019 | Doering | B60K 6/485 |
| 2019/0202438 A1* | 7/2019 | Park | B60K 6/48 |
| 2019/0244101 A1* | 8/2019 | Ando | G01B 11/00 |
| 2019/0329772 A1* | 10/2019 | Graves | B60W 30/16 |
| 2019/0359223 A1* | 11/2019 | Duale | B60W 50/12 |

* cited by examiner

SYSTEMS AND METHODS FOR VEHICLE ACCELERATION EVENT PREDICTION INHIBIT

TECHNICAL FIELD

The present specification generally relates to hybrid electric vehicles and, more specifically, to systems and methods for inhibiting acceleration event predictions for powertrain control based upon machine learning.

BACKGROUND

Hybrid vehicles may be equipped with computing devices that use an acceleration event prediction logic for a powertrain control, which is based on a determination of current vehicle operating conditions affecting engine power for different purposes in different situations. The acceleration event prediction logic predicts and prepares the powertrain control for a change in a powertrain based on a future event or based on changes in the current operating vehicle conditions. For example, the acceleration event prediction may enable the powertrain to shift in a sport mode so to quickly accelerate or into a cruise mode to keep a steady speed. As such, the acceleration event prediction can provide improved fuel efficiency, performance, and driver comfort. However, when a driver attempts to override a prediction, the prediction may not coincide with the driver's action and/or the current vehicle conditions.

Accordingly, a need exists for inhibiting an acceleration event prediction that also learns from the driver's behavior so that in similar situations an acceleration event prediction may be used for the powertrain control.

SUMMARY

In one embodiment, a method for controlling a powertrain of a vehicle is provided. The method includes determining a current vehicle operating condition of a vehicle. An acceleration event is predicted based on a plurality of stored predictions and the current vehicle operating condition. The acceleration event prediction is inhibited such that the acceleration event prediction is not permitted to influence a powertrain control of the vehicle.

In another embodiment, a method for controlling a powertrain of a vehicle is provided. The method includes determining a current vehicle operating condition of a vehicle. An acceleration event is predicted based on a plurality of stored predictions and the current vehicle operating condition. A determination is made to not inhibit the acceleration event prediction such that the acceleration event prediction is permitted to influence a powertrain control of the vehicle.

In yet another embodiment, a vehicle includes an engine, a powertrain, a processing device and a non-transitory, processor-readable storage medium is provided. The powertrain is operably coupled to the engine. The processing device is communicatively coupled to the vehicle powertrain. The non-transitory, processor readable storage medium includes one or more programming instructions thereon that, when executed, cause the processing device to determine a current vehicle operating condition of a vehicle and predict an acceleration event based on a plurality of stored predictions and the current vehicle operating condition. The non-transitory, processor-readable storage medium further includes one or more programming instructions thereon that, when executed, determine to not inhibit the acceleration event prediction such that the acceleration event prediction is permitted to influence a powertrain control of the vehicle, determine a driver noncompliance with the acceleration event prediction, store the driver noncompliance with the acceleration event prediction based on a driver operation of the vehicle, and store the current vehicle operating condition during the driver noncompliance with the acceleration event prediction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to systems and methods for identifying conditions, which will inhibit an acceleration event prediction feature for powertrain control of hybrid vehicles. Inhibiting the acceleration event prediction feature is based on a vehicle-based computing device learning a plurality of current vehicle operating conditions and a driver behavior when a driver does not comply, or deviates, from the acceleration event prediction. As such, a driver's compliance to the acceleration event prediction is monitored so to determine whether the driver complied with the prediction. In the event the driver does not comply with the prediction, the plurality of current vehicle operating conditions are recorded along with the driver's nonconformance to the prediction. The vehicle current conditions may be determined based on a plurality of sensors and/or a sensing device so to determine a time of day, a weather condition, a traffic condition, a location of the vehicle, and/or the like. The vehicle-based computing device stores such current vehicle operating conditions for learning data. Moreover, the vehicle-based computing device records inputs of the driver such as length of acceleration, length of deceleration, and other information directly related to the driver so to learn this data. These saved recordings are self-categorized by the type of data and the nature of the data such that the system learns the driver's behaviors and/or the vehicle operating condition in those specific situations so to determine whether to inhibit a future acceleration event prediction, which may be when the vehicle-based computing device determines the vehicle is under similar operating conditions. In addition, the systems and methods described herein can produce and/or inhibit prediction data with computing devices not within the vehicle, using a network, and/or using servers in conjunction with vehicle-based computing devices.

As used herein, the term cooperation may mean that a driver acted as expected in relation the acceleration event prediction and subsequent acceleration event powertrain control. That is, the driver's behavior was within a plurality of preset parameters that define some vehicle action, such as a speed or a current mode of the vehicle. The term non-compliance may mean that the driver exceeded or deviated from the plurality of preset parameters of the acceleration event prediction. As such, the deviation from the plurality of preset parameters determines the driver non-compliance. As used herein, the term learning data may be machine learned data. The learning data approach allows the system to determine whether to inhibit an acceleration event prediction based on data obtained from a driver and from the current vehicle systems.

As such, the learning data may be collected from either the driver's actions and/or driver inputs or from a plurality of sensors, a sensing device, and/or the like. A driver deviation from what a processing device of the vehicle would have expected the driver to react establishes a plurality of categories. Depending on the source of the data (i.e. from a sensor or the driver action), the learning data may be self-categorized to match the source and the specific situation the data was collected. Further, the data may be used to start a new category or add data to an existing category. For instance, learning data collected from a driver noncompliance would be self-categorized under driver non-compliance and may be further self-categorized based on the exact driver inputs and/or noncompliance with the specific situation in which the driver deviated from the acceleration event prediction, as discussed in greater detail below. On the other hand, for example, the vehicle conditions may be self-categorized separately from the driver non-compliance and again may be further self-categorized based on the plurality sensors, the sensor device, and/or the like, such that vehicle conditions such as an amount of traffic, other obstacles near the vehicle, and/or the like may be monitored. These conditions may be self-categorized based on the specific situation in which a determination was made as to whether a powertrain control or the driver would behave outside of a plurality of preset parameters.

Figure 1:
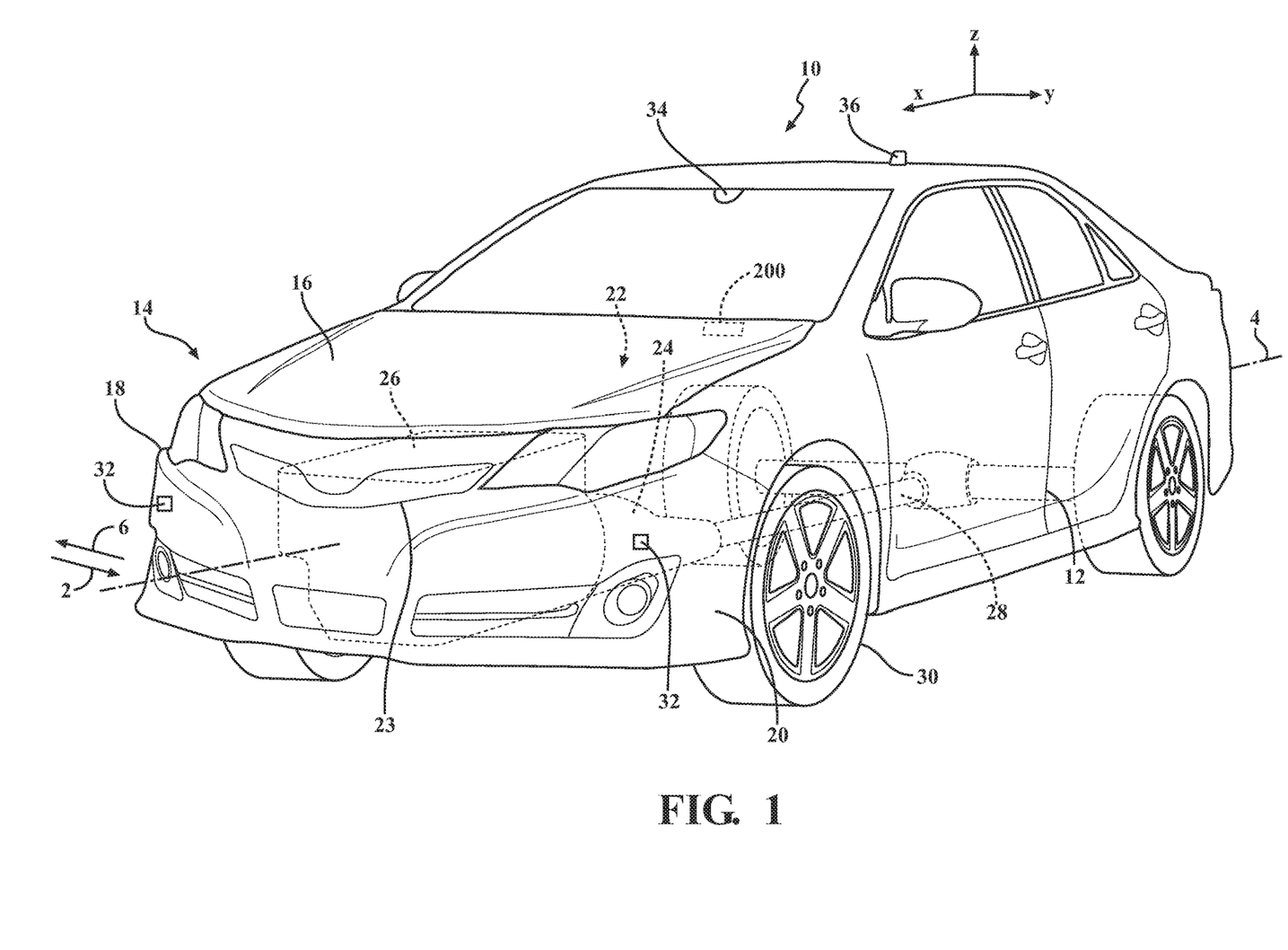
FIG. 1 schematically depicts a perspective view of a vehicle according to one or more embodiments shown or described herein.

Also, as used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 includes a vehicle body 12 having a front end assembly 14 that includes a hood 16, front fenders 18 and 20, and a front grille assembly 23 located between the front fenders 18 and 20 and spaces apart the front fenders 18 and 20 so to form an engine compartment 22. A transmission 24 is provided within the engine compartment 22 that transmits output of a vehicle engine 26, such as an internal combustion engine or hybrid engine, to a powertrain 28, which in turn is operably connected to two or more wheels 30.

In addition, the front fenders 18 and 20 and/or the front grille assembly 23 may further include a plurality of sensors 32 sensing live traffic conditions. The vehicle 10 may further include a sensing device 34 for sensing live traffic conditions, weather, and/or the like, and an antenna 36 for receiving data such as GPS, live traffic conditions, weather, and/or the like from a network outside of the vehicle 10.

The vehicle 10 may generally be any vehicle with one or more onboard computing devices, particularly computing devices that contain hardware for processing data, storing data, and capturing images in or around the vehicle. Thus, the vehicle 10 and/or components thereof may perform one or more computing functions, such as receiving data (e.g. from the antenna 36), capturing data (e.g., from the plurality of sensors 32 and/or with the sensing device 34), processing the received and/or captured data, storing the data, and providing processed data for machine learning algorithms, as described in greater detail herein. It should be appreciated that the plurality of sensors 32, the sensing device 34 and/or the antenna 36 are in communication with an on board vehicle component 200 and configured to detect driver inputs, driver reactions, and current vehicle conditions, as described in greater detail herein.

Figure 2A:
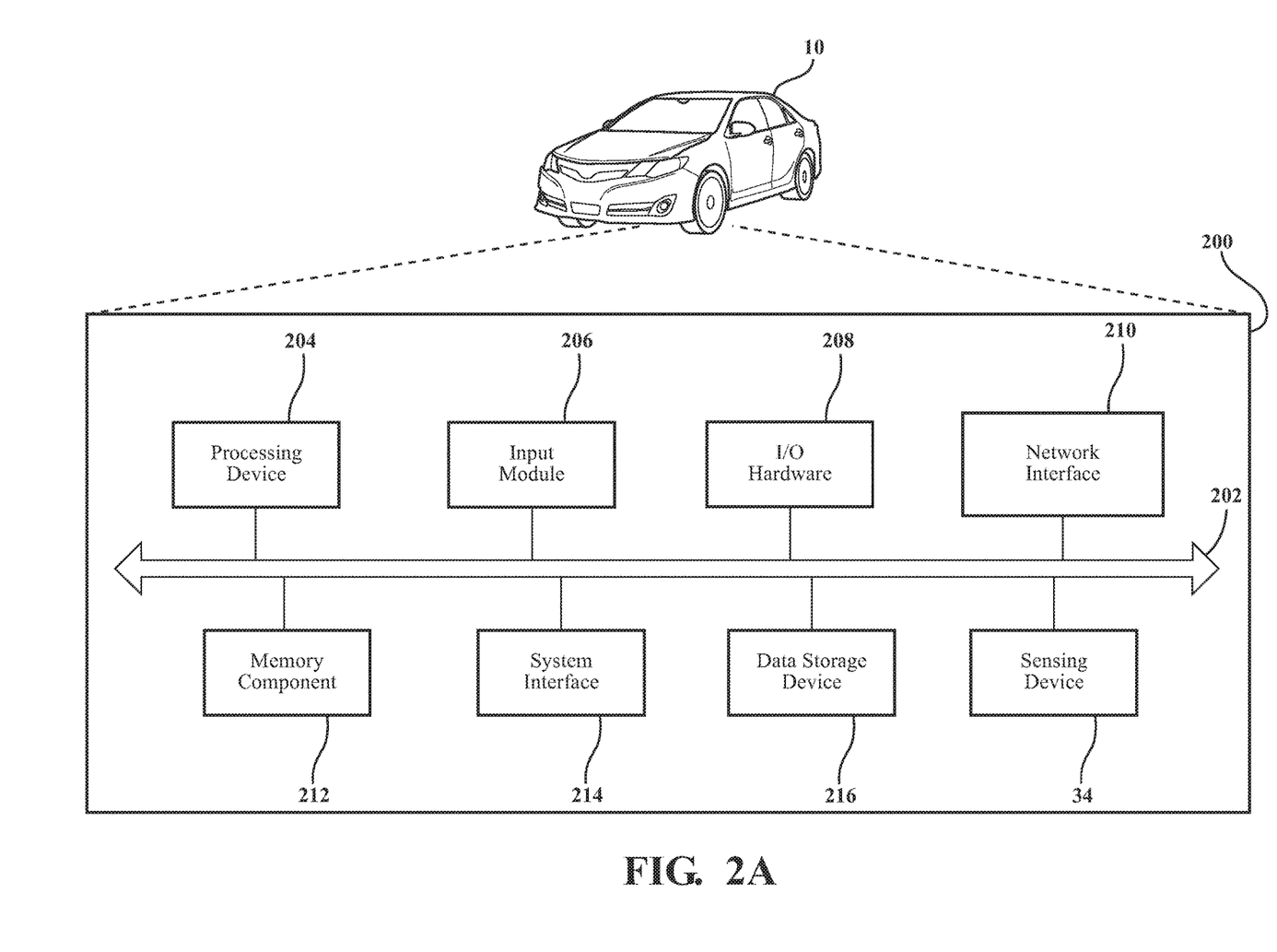
FIG. 2A schematically depicts illustrative hardware components of a vehicle computing device that may be used in controlling a powertrain of a vehicle according to one or more embodiments shown and described herein.

FIG. 2A schematically depicts illustrative hardware components of the vehicle 10 that may be used in learning data creation for machine learning configured to control the powertrain 28 of the vehicle 10. While the components depicted in FIG. 2A are described with respect to the vehicle 10, it should be understood that similar components may also be used for a user computing device and/or a server computing device without departing from the scope of the present disclosure.

The vehicle 10 may include the vehicle component 200 having a non-transitory computer-readable medium for completing the various processes described herein, embodied as hardware, software, and/or firmware, according to embodiments shown and described herein. While in some embodiments the vehicle component 200 may be configured as a general purpose computer with the requisite hardware, software, and/or firmware, in other embodiments, the vehicle component 200 may also be configured as a special purpose computer designed specifically for performing the functionality described herein. For example, the vehicle component 200 may be a device that is particularly adapted to utilize machine learning algorithms for the purposes of acceleration event prediction and inhibition for controlling the powertrain 28 of the vehicle 10. In another example, the vehicle component 200 may be a device that is particularly adapted to utilize machine learning algorithms for the purposes of monitoring a driver's input and/or a driver's reaction to the acceleration prediction, predict the driver's behaviors, and provide feedback and/or execute commands. In embodiments where the vehicle component 200 is a general purpose computer, the systems and methods described herein provide a mechanism for improving functionality by replacing determining the acceleration event prediction and determining whether to inhibit the acceleration event prediction such that the machine learning processes may filter unnecessary or unneeded acceleration event predictions and/or generate new predictions based on the driver's behavior and/or vehicle operating conditions so to improve vehicle performance.

Still referring to FIG. 2A, the vehicle component 200 may generally be an onboard vehicle computing system. In some embodiments, the vehicle component 200 may be a plurality of vehicle computing systems.

As also illustrated in FIG. 2A, the vehicle component 200 may include a processing device 204, an I/O hardware 208, a network interface hardware 210, a non-transitory memory component 212, a system interface 214, a data storage device 216, and a sensing device 34. A local interface 202, such as a bus or the like, may interconnect the various components.

The processing device 204, such as a computer processing unit (CPU), may be the central processing unit of the vehicle component 200, performing calculations and logic operations to execute a program. The processing device 204, alone or in conjunction with the other components, is an illustrative processing device, computing device, processor, or combination thereof. The processing device 204 may include any processing component configured to receive and execute instructions (such as from the data storage device 216 and/or the memory component 212).

The memory component 212 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 212 may include one or more programming instructions thereon that, when executed by the processing device 204, cause the processing device 204 to complete various processes, such as the processes described herein with respect to FIG. 3. Still referring to FIG. 2A, the programming instructions stored on the memory component 212 may be embodied as a plurality of software logic modules, where each logic module provides programming instructions for completing one or more tasks, as described in greater detail below with respect to FIG. 2B.

The network interface hardware 210 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 210 may provide a communications link between the vehicle 10 and the other components of the network (not shown).

Still referring to FIG. 2A, the data storage device 216, which may generally be a storage medium, may contain one or more data repositories for storing data that is received and/or generated. The data storage device 216 may be any physical storage medium, including, but not limited to, a hard disk drive (HDD), memory, removable storage, and/or the like. While the data storage device 216 is depicted as a local device, it should be understood that the data storage device 216 may be a remote storage device. Illustrative data that may be contained within the data storage device 216 is described below with respect to FIG. 2C. It should be appreciated that the amount of available storage space in the data storage device 216 may be limited due to its location in the vehicle component 200 in some embodiments. As such, it may be necessary to minimize the size of the data stored thereon, as described in greater detail herein.

Still referring to FIG. 2A, the I/O hardware 208 may communicate information between the local interface 202 and one or more other components of the vehicle 10. For example, the I/O hardware 208 may act as an interface between the vehicle component 200 and other components, such as navigation systems, meter units, mobile phone systems, infotainment systems, and/or the like. In some embodiments, the I/O hardware 208 may be utilized to transmit one or more commands to the other components of the vehicle 10.

The system interface 214 may generally provide the vehicle component 200 with an ability to interface with one or more external devices such as, for example, the network. Communication with external devices may occur using various communication ports. An illustrative communication port may be attached to a communications network.

Still referring to FIG. 2A, the sensing device 34 may be communicatively coupled to the local interface 202 and coupled to the processing device 204 via the local interface 202. The sensing device 34 may be any imaging device, a sensor, or a detector that is suitable for obtaining data relating to the current vehicle operating conditions. As used herein, the term "current vehicle operating condition" or "operating conditions" refers to a vehicle location data, a stop location data, a speed limit data, a traffic conditions data, a driver history, a plurality of weather conditions, and/or the like. Any suitable commercially available sensing device 34 may be used without departing from the scope of the present disclosure. In some embodiments, the sensing device 34 may be coupled to one or more other components that provide additional functionality for sensing, such as, for example, the plurality of sensors 32.

Figure 2B:
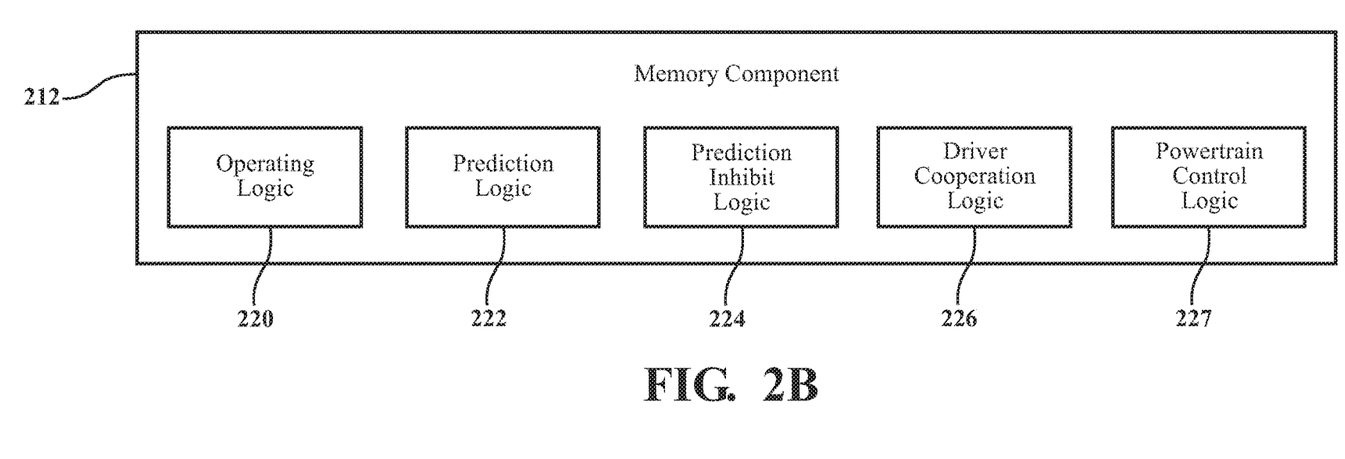
FIG. 2B schematically depicts an illustrative memory component containing illustrative logic components according to one or more embodiments shown and described herein.

With reference to FIG. 2B, in some embodiments, the program instructions contained on the memory component 212 may be embodied as a plurality of software modules, where each module provides programming instructions for completing one or more tasks. For example, FIG. 2B schematically depicts the memory component 212 containing illustrative logic components according to one or more embodiments shown and described herein. As shown in FIG. 2B, the memory component 212 may be configured to store various processing logic, such as, for example, operating logic 220, prediction logic 222, prediction inhibit logic 224, driver cooperation logic 226, and/or powertrain control logic 227 (each of which may be embodied as a computer program, firmware, or hardware, as an example). The operating logic 220 may include an operating system and/or other software for managing components of the vehicle component 200 (FIG. 2A). Further, the operating logic 220 may contain one or more software modules for transmitting data, and/or analyzing data.

Still referring to FIG. 2B, the prediction logic 222 may contain one or more software modules for collecting data from one or more sources (e.g. the sensing device 34, the plurality of sensors 32 depicted in FIG. 1, the antenna 36 depicted in FIG. 1, and/or the like) and/or converting data, and self-categorizing the data for machine learning, as described in greater detail herein. Moreover, the prediction logic 222 may create and/or process the data collected such that data may be self-categorized based on the information contained in the data and analyzed so to determine the acceleration event powertrain prediction. The prediction inhibit logic 224 may contain one or more software modules for collecting current vehicle condition data from one or more sources (e.g. the sensing device 34, the plurality of sensors 32 depicted in FIG. 1, the antenna 36 depicted in FIG. 1, and/or the like) when a driver does not cooperate with the acceleration event prediction such that the data may be converted, and/or self-categorized for machine learning, as described in greater detail herein. In addition, the prediction inhibit logic 224 may determine whether, when certain data is analyzed, such as the self-categorized data from current vehicle operations for machine learning or the self-categorized data from the driver cooperation logic 226 for machine learning, the acceleration event prediction should be inhibited, as described in greater detail herein. The prediction inhibit logic 224 may determine to inhibit the acceleration event prediction such that the acceleration event prediction does not have an impact on a powertrain control, as discussed further herein. The prediction inhibit logic 224 may reside on different computing devices. As an example, one or more of the functionalities and/or components described herein may be coupled to the memory component 212 via the network, such that access to the prediction inhibit logic 224 may be provided. The driver cooperation logic 226 may contain one or more software modules for determining and self-categorizing a plurality of the vehicle operation conditions, driver reactions, and/or the like when the driver does not follow the acceleration event prediction, as discussed in greater detail herein. The powertrain control logic 227 may contain one or more software modules for determining an acceleration event powertrain control, which may be determined from the acceleration event powertrain prediction from the prediction logic 222.

Figure 2C:
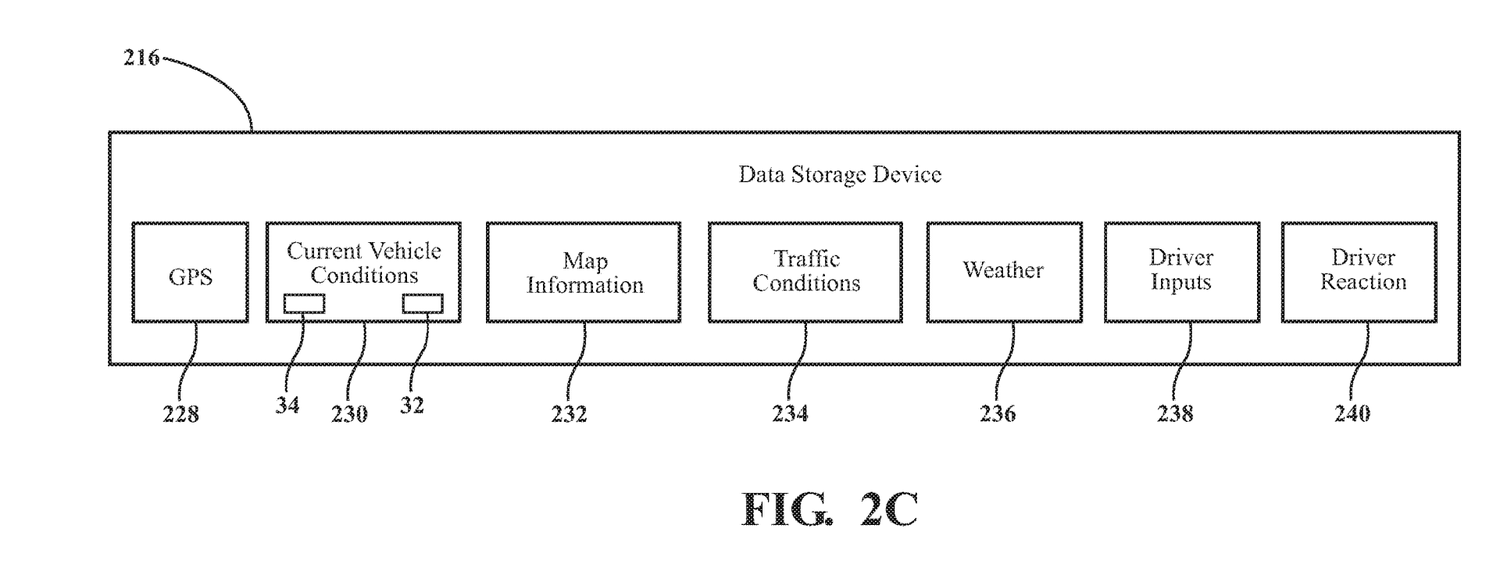
FIG. 2C schematically depicts an illustrative data storage device containing illustrative data components according to one or more embodiments shown and described herein.

FIG. 2C schematically depicts a block diagram of various data contained within a storage device (e.g., the data storage device 216). As shown in FIG. 2C, the data storage device 216 may include, for example, a vehicle current global positioning system (GPS) data 228 storing a location and/or a plurality of stored GPS locations. Moreover, it should be understood that the GPS data 228 stored may be live data or stored data based on, for example, route prediction. It should also be understood that the GPS data 228 stored may be data gathered by the sensing device 34, received by the antenna 36, and/or the like. It should be appreciated that the GPS data 228 may not be stored permanently, but instead may be stored temporarily such that the data may be extracted therefrom.

The data storage device 216 may further include, for example, a current vehicle conditions data 230, which may be received from the plurality of sensors 32, the sensing device, and/or the like. The data storage device 216 further includes a plurality of map information data 232 for example, known speed limits, school zones, construction zones, and/or the like. The plurality of map information data 232 may be captured in real time or be preloaded and updated through the network using the antenna 36 and/or the like. It should be appreciated that the current vehicle conditions data 230 and/or the plurality of map information data 232 may not be stored permanently, but instead may be stored temporarily such that the data may be extracted therefrom.

The data storage device 216 further includes a traffic condition data 234, for example, traffic backups, heavy and/or light traffic conditions, whether other vehicles, motorcycles, bikes, pedestrians, and/or the like are near the vehicle 10 by using the plurality of sensors 32, the sensing device 34, and/or the like. The data storage device 216 further includes a weather data 236, for example a weather condition the vehicle 10 is currently expecting and/or the weather condition that the vehicle 10 is likely to experience. For example, whether the weather is sunny, overcast, daytime, nighttime, and the like and/or whether the vehicle 10 is experiencing fog, rain, snow, and the like. It should be appreciated that the traffic condition data 234 and/or the weather data 236 may not be stored permanently, but instead may be stored temporarily such that the data may be extracted therefrom.

Further, the data storage device 216 includes a driver input data 238 and a driver reaction data 240. The driver input data 238 stores data related to the vehicle 10 as controlled by the driver such as a rate of acceleration, a rate of deceleration, a steering wheel position, a brake pedal position, and/or the like. It should be appreciated that the driver input data 238 may be gathered by a plurality of sensors disposed at various key places within the vehicle 10. The driver reaction data 240 includes data related to a plurality of driver tendencies and habits, and a driver response to the current vehicle operation conditions. It should be appreciated that the driver input data 238 and/or the driver reaction data 240 may not be stored permanently, but instead may be stored temporarily such that the data may be extracted therefrom.

It should be understood that the components illustrated in FIGS. 2A-2C are merely illustrative and are not intended to limit the scope of this disclosure. More specifically, while the components in FIGS. 2A-2C are illustrated as residing within the vehicle component 200 of the vehicle 10, this is a non-limiting example. In some embodiments, one or more of the components may reside external to the vehicle component 200 and/or the vehicle 10.

As mentioned above, the various components described with respect to FIGS. 2A-2C may be used to carry out one or more processes and/or produce data that the system learns so to have a cooperative prediction or inhibit the acceleration event prediction based on the driver's behaviors so that a new prediction is generated the next time the vehicle-based computing device determines the vehicle is in similar operating conditions.

Now referring to FIG. 3, a method 300 of inhibiting an acceleration event prediction using machine learning will now be discussed. An input may be received at block 305. The input may generally include data relating to the current vehicle operating condition so that the prediction logic 222 may make an acceleration event prediction.

For instance, the prediction logic 222 may need to determine whether the vehicle is utilizing its battery for self-propulsion without its vehicle engine 26 or vice versa. Further, an acceleration event prediction may utilize any suitable criteria, such as vehicle location data, stop location data, speed limit data, traffic conditions, driver history, vehicle history, and/or weather conditions. For example, if a vehicle approaches a stretch of road where other vehicles have made rapid accelerations (such as a location located after a traffic light or stop sign), acceleration data from the prior accelerations may be utilized to model future accelerations. In this example, a quantity of vehicles around the vehicle 10 is determined utilizing the plurality of sensors 32 and/or the sensing device 34, where a greater quantity of vehicles may decrease the likelihood of an increased acceleration event. Continuing with this example, traffic light data may be received via the sensing device 34 and/or the antenna 36 (e.g., having an area of many unsynchronized lights may increase the likelihood of an acceleration event). Continuing further with this example, the time of year may also be considered (e.g., winter with ice/snow may decrease the likelihood of an acceleration event). In some embodiments, an acceleration event may be based upon an amount of input force provided by a driver (e.g., the amount of force received from the driver pressing or releasing the accelerator).

As such, the input data relating to making a prediction may be received via the input module 206, the I/O hardware 208 and/or the system interface 214 and may be analyzed, by the processing device 204 (FIG. 2A), using for example, the various inputs for a prediction logic determination, at block 310. Once the prediction logic is determined at block 310, the processing device 204 (FIG. 2A) determines whether to execute the prediction inhibit logic, at block 315. The prediction inhibit logic determination is based on the machine learned self-categorized data from the prediction inhibit logic 224 and the machine learned self-categorized data from the driver cooperation logic 226. That is, the current vehicle conditions and the driver behaviors, which are learned, are compared against the determined acceleration prediction (at block 310) so to decide whether to preemptively prevent or inhibit the prediction logic determination of block 310 rather than the powertrain control logic 227, at block 320. If it is determined to not make the prediction logic determination of block 310, the method 300 of inhibiting an acceleration event prediction using machine learning ends at block 325. That is, the prediction logic of block 310 does not influence the powertrain control at block 330. In this instance, the powertrain control logic 227 (FIG. 2B) can maintain the powertrain 28 of the vehicle 10 such that the powertrain 28 operates uninfluenced by the acceleration prediction logic and does not permit the powertrain control logic 227 (FIG. 2B) to automatically change modes based on the prediction logic determination.

Figure 3:
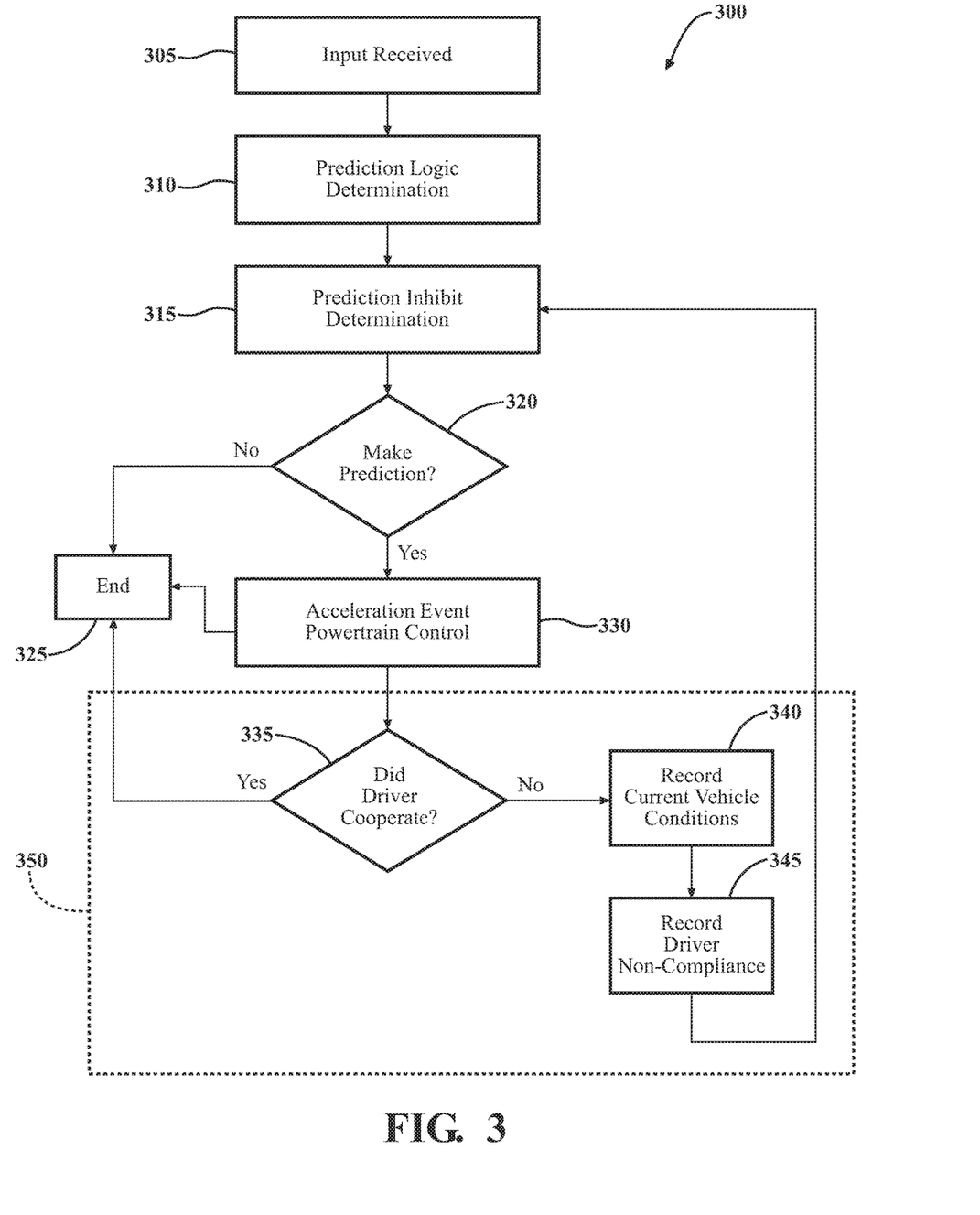
FIG. 3 depicts a flow diagram of an illustrative method of inhibiting acceleration event prediction according to one or more embodiments shown and described herein.

Still referring to FIG. 3, on the other hand, if it is determined to make the prediction at block 320, the prediction logic determination of block 310 is allowed to proceed to the acceleration event powertrain control, at block 325. The acceleration event powertrain control may permit the powertrain 28 of the vehicle 10 to change modes, such as, without limitation, into a sport mode where the powertrain may permit a more rapid or aggressive acceleration or a cruise mode where the powertrain is at a lower revolutions per minute (RPM) so to conserve fuel efficiency. The acceleration event prediction determines attempts to maximize or improve the acceleration event powertrain control based on the conditions as outlined above.

Following the acceleration event powertrain control, at block 330, the prediction logic determination of block 310 ends at block 325. However, for machine learning data purposes, at 350, the system determines whether the driver cooperates with the accelerator event powertrain control, at block 335. If the driver cooperated with the prediction logic determination of block 315, then the machine learning data component 350 is ended at block 325.

As such, the learning data is established by the driver's non-compliance with the acceleration event powertrain control. The driver noncompliance, or deviation, determined at block 355 begins the self-categorization of the learning data. That is, the driver noncompliance, or deviation, from what the processing device 204 (FIG. 2A) of the vehicle 10 would have expected the driver to react establishes a plurality of categories for the learning data. As such, the processing device (FIG. 2A) forms a new category or classifies the non-compliance, or deviation, into an existing category, as discussed below. Over time, these patterns and categories are used to establish whether the acceleration event prediction would exceed the plurality of preset parameters.

If the driver did not cooperate with the acceleration event powertrain control at block 335, then two general categories of learning data are recorded: (1) current vehicle conditions are recorded, at block 340, and (2) the driver non-compliance is also recorded, at block 345. As discussed here, both of these two general categories are used such that the learning data may be self-categorized based on specific situations in which a determination may be made as to whether the vehicle exceeds the plurality of preset parameters. As such, the learning data is used, for instance, to identify patterns, which are stored in the plurality of categories. The current vehicle conditions data and the driver non-compliance data are saved in the data storage device 216 (FIG. 2C) so that this learning data may then be used as part of the filter for future determination of whether to inhibit a prediction, at block 315. This process of prediction logic, prediction logic inhibit determination, and acceleration event powertrain control may be repeated at block 315 until the input is not received at block 305.

It should be noted that determining the driver cooperation is used for the learning data because the driver is presumed to take positive actions despite the acceleration event prediction. When the driver does not comply with the acceleration event prediction, the action of the driver takes precedent over the acceleration event prediction. As such, the learning of the data when the driver does not follow the prediction logic determination of block 315 is used in future instances so to filter, remove, more accurately predict, and/or the like, the acceleration event powertrain control when the vehicle experiences similar current vehicle conditions.

For example, with reference to FIGS. 1-3, suppose the vehicle 10, traveling at a first speed, encounters a light rain, as determined by the processing device 204 (FIG. 2A) accessing the weather data 236 the data storage device 216, and the prediction logic 222 determines that the vehicle 10 will slow down and travel at a steady, second speed. However, the driver does not slow down, but instead maintains the first speed of the vehicle 10. This example describes where a driver does not cooperate with an expected acceleration event powertrain control of block 330. The current vehicle conditions is recorded at block 340 and the driver noncompliance is saved at block 345 so to learn this data such that the learned data may inhibit future predictions and/or aid in making in future predictions.

In another non-limiting example and still referring to FIGS. 1-3, suppose the vehicle 10 was travelling at a first speed and approaches a second vehicle from the rear, as detected by the plurality of sensors 32 and/or the sensing device 34. As the vehicle 10 slows to a second speed, the prediction logic 222 may generate an acceleration event prediction so to predict that when the second vehicle was no longer in front of the vehicle 10, the powertrain 28 should be adjusted for a long acceleration back to the first speed over a predetermined number of seconds, such a five seconds. However, when the vehicle in front was clear, the driver did not cooperate with the acceleration event prediction. Instead, the driver quickly accelerated to the first speed or beyond, in less than the predetermined number of seconds. This example describes where the driver does not cooperate with the expected acceleration event prediction at block 335. The current vehicle conditions are recorded, at block 340, and the driver non-compliance is saved, at block 345, so to learn data relating to both the driver compliance in block 345 and the current vehicle conditions as gathered from the plurality of sensors 32, the sensing device 34, the antenna 36, and/or the like such that the learned data may be used in future inhibiting of the prediction logic of block 310 and/or future prediction logic.

It should now be understood that the methods, systems, and vehicle components described herein may function to inhibit an acceleration event prediction determination to control the powertrain as a type of software filter using machine learning factors such as current vehicle operating conditions and driving behaviors so to prevent or inhibit a prediction rather than the powertrain control. The method for inhibiting an acceleration event prediction includes determining a current vehicle operating condition. An acceleration event is predicted based on a plurality of stored predictions that match the current vehicle operating condition. A determination is made whether to inhibit the acceleration event prediction. The acceleration event prediction is permitted to modify an acceleration event powertrain control such that a powertrain control occurs. A driver noncompliance with the acceleration event powertrain control is stored as a machine learning data and the current vehicle operating condition is stored as machine learning data upon the driver noncompliance.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of controlling a powertrain of a vehicle, comprising:
   determining a current vehicle operating condition of the vehicle;
   predicting an acceleration event based on a plurality of stored predictions and the current vehicle operating condition; and
   inhibiting a prediction of the acceleration event so to prevent the acceleration event prediction from influencing a powertrain control of the vehicle,
   wherein inhibiting the prediction of the acceleration event is determined by a plurality of learned data based on a driver operation of the vehicle, and
   wherein the learned data is from determining a driver noncompliance with the acceleration event prediction based on the driver operation of the vehicle.

2. The method of claim 1, wherein the learned data is from the current vehicle operating condition of the vehicle during a driver noncompliance with the acceleration event prediction based on the driver operation of the vehicle.

3. A method of controlling a powertrain of a vehicle, comprising:
   determining a current vehicle operating condition of a vehicle;
   predicting an acceleration event based on a plurality of stored predictions and the current vehicle operating condition;
   determining to not inhibit the acceleration event such that the acceleration event prediction is permitted to influence a powertrain control of the vehicle;
   determining a driver noncompliance with the acceleration event prediction;
   storing the driver noncompliance with the acceleration event prediction based on the driver operation of the vehicle; and
   storing the current vehicle operating condition during the driver noncompliance with the acceleration event prediction,
   wherein the determination to not inhibit the acceleration event is determined by a plurality of learned data based on a driver operation of the vehicle, and
   wherein the driver noncompliance with the acceleration event prediction is used as learning data to identify conditions to inhibit a plurality of future acceleration event predictions.

4. The method of claim 3, wherein the current vehicle conditions upon the driver noncompliance with the acceleration event prediction is used as learned data to identify conditions to inhibit a plurality of future acceleration event predictions.

5. The method of claim 3, wherein the current vehicle operation condition comprises a vehicle location data, a map information data, a traffic conditions data, a weather conditions data, and a driver reactions data.

6. The method of claim 3, wherein the driver noncompliance is determined by monitoring the current vehicle operation and a plurality of driver inputs data.

7. The method of claim 6, wherein the plurality of driver inputs data comprise a rate of acceleration, a rate of deceleration, a plurality of driver tendencies and habits, and a driver response to the current vehicle operation conditions.

8. A vehicle comprising:
   an engine;
   a powertrain operably coupled to the engine; and
   a processor, communicatively coupled to the vehicle powertrain;
   a non-transitory, processor-readable storage medium, the non-transitory, processor readable storage medium comprising one or more programming instructions thereon that, when executed, cause the processing device to:
   determine a current vehicle operating condition of a vehicle;
   predict an acceleration event based on a plurality of stored predictions and the current vehicle operating condition;
   determine to not inhibit the acceleration event based on a plurality of learned data associated with a driver operation of the vehicle, such that the acceleration event prediction is permitted to influence a powertrain control of the vehicle;
   determine a driver noncompliance with the acceleration event prediction;
   store the driver noncompliance with the acceleration event prediction based on the driver operation of the vehicle; and
   store the current vehicle operating condition during the driver noncompliance with the acceleration event prediction,
   wherein the driver noncompliance with the acceleration event prediction is used as learning data to identify conditions to inhibit a plurality of future acceleration event predictions.

9. The vehicle of claim 8, wherein the current vehicle conditions upon the driver noncompliance with the acceleration event prediction is used as learned data to identify conditions to inhibit a plurality of future acceleration event predictions.

10. The vehicle of claim 8, wherein the current vehicle operation condition comprises a vehicle location data, a map information data, a traffic conditions data, a weather conditions data, and a driver reactions data.

11. The vehicle of claim 8, wherein the driver noncompliance is determined by monitoring the current vehicle operation and a plurality of driver inputs data.

12. The vehicle of claim 11, wherein the plurality of driver inputs data comprise a rate of acceleration, a rate of deceleration, a plurality of driver tendencies and habits, and a driver response to the current vehicle operation conditions.

13. The vehicle of claim 8, wherein the vehicle is a hybrid electric vehicle.

* * * * *